INVENTOR.
LEWIS B. SIMON
BY Howard J. Murray, Jr.
AGENT
Q. Baxter Warner
ATTORNEY March 3, 1970 L. B. SIMON 3,499,108

COMMUNICATION SYSTEM

Filed Aug. 25, 1965 2 Sheets-Sheet 2

INVENTOR.
LEWIS B. SIMON

BY Howard J. Murray, Jr. AGENT
Q. Baxter Warner
ATTORNEY 3,499,108

COMMUNICATION SYSTEM

Lewis B. Simon, Oxnard, Calif., assignor to The United States of America as represented by the Secretary of the Navy Filed Aug. 25, 1965, Ser. No. 482,641
Int. Cl. H04n *3/16*
U.S. Cl. 178—7.1 1 Claim

ABSTRACT OF THE DISCLOSURE

A communication system in which analog video signal is divided into discrete amplitude levels for transmission as pulse code modulation and with a separate frequency being assigned to each level. In a preferred embodiment, the analog signal is quantized into individual pulses, each pulse being representative of an instantaneous amplitude level of the input wave. A plurality of detectors are designed so that each passes only those signal components which exceed a predetermined amplitude level which is different from the respective levels of all of the remaining detectors. Each detector acts upon the reception thereby of an input signal to preclude the application of such signal to those remaining detectors which are designed to pass energy having a lower amplitude level.

The invention described herein may be manufactured and used by or for the Government of the United States of America for governmental purposes without the payment of any royalties thereon or therefor.

The present invention relates to the transmission and reception of intelligence at least one aspect of which may vary at video frequency, and in particular relates to a communication system in which the data to be transmitted is converted from analog to digital form.

At the present time there are two conventional methods for transmitting a data signal which varies at video frequency. One of these methods is by amplitude modulation of the carrier, and the other is by frequency modulation—that is, by impressing the continuous variation of analog information on the transmitter to vary its frequency. Another procedure which has received serious consideration is that of encoding values of the video data in binary, tenary or other code, and transmitting this digitized information to a point where it may be received, decoded, and the video information reconstituted.

Certain disadvantages are present when the carrier is either amplitude or frequency modulated. These include a high susceptibility to multipath, Doppler and electronic environment degradation. Also, a very high signal-to-noise ratio is required in order to obtain good reproduction, and this necessitates the generation of high power levels at the transmitter. With respect to the expedient of encoding the analog signal, this may be carried out by generating a train of pulses and then varying a particular parameter thereof in analog fashion. For example, with variable pulses, either the pulse width or the pulse amplitude may be varied as an analog of the invention signal. The first method is termed pulse width (or duration) modulation (PDM) and the second is termed pulse amplitude modulation (PAM). On the other hand, if the pulse width and amplitude are held constant, then the frequency of occurrence of the pulses, or the variation of the time interval from a reference pulse, can become the information analog. The first of these is called pulse frequency modulation (PFM) and the second pulse position modulation (PPM). However, the generation of a shaped wave train and the analog modulation of any of its parameters offers little transmission improvement over standard techniques such as the amplitude modulation of a carrier. Not only is pulse transmission equipment of this type extremely complex, but it inherently embodies a certain amount of cumulative error, which results in considerable distortion of the received signal. The advantages of such a system, therefore, are open to question.

However, when the information is quantized and the levels are coded, the receiver needs only to determine the *presence* or *absence* of a pulse in order to reconstruct the information. This allows the signal-to-noise ratio of the system to be reduced, and, furthermore, cross-talk is held to a very low level. There are two catogories of quantized encoding, and these may initially be termed series and parallel. In series encoding (which is normally the product of series quantizing) the analog information is subjected to an iterative process which results in sequential on-off pulses to define a shade of gray (in an image) by means of the chosen code. For example, if binary were chosen as the code for shades of gray, one word of three "bits" would be required to define eight shades. Therefore, each element of information would require three bits for its description. Hence, the bandwidth, or information rate, would be tripled, and, since the data rate encountered, such as for video, is already extremely high, the use of such series encoding is not ordinarily feasible. In parallel encoding (when the quantizing logic encodes the signal and has a simultaneous output of all elements of the bit code) the bit interval equals the picture element interval, and hence the bit frequency required for transmission equals the picture element frequency. Because the coded bits are simultaneously transmitted as pulses of discrete frequencies, the power spectrum distribution can be computed. However, since the bits are transmitted simultaneously, a serial code such as binary cannot be employed, and the bits must be weighted for coding.

There are several known methods of analog-to-digital conversion. Perhaps the most highly developed and widely used method is that of time encoding. This is based upon the generation of a linear sweep or ramp, with the time interval from the initiation of the sweep until it rises to equal the analog voltage being determined. At the instant of equality therebetween, a pulse command is emitted to "read" the binary counters. This produces a direct analog-to-binary conversion. Such a system, however, suffers from three serious deficiencies: (1) the accuracy thereof is a function of sweep linearity and the precision of the count initiation, and it is also necessary to note precisely the time at which the reading is taken in order to minimize distortion, (2) random errors are possible when the counters change during the finite time of the readout pulse. This source of serious errors is not readily eliminated, and (3) the number of conversions per second is more than an order of magnitude too slow for an optimized system of the type with which the present concept is concerned.

Feedback (voltage comparison) encoding is a method which employs a sequential comparison of test voltages, starting with the highest. If the unknown value is less than the test voltage, the latter is subtracted, and the remainder is sequentially compared with successively smaller voltages in powers of one-half; the result is a binary coding of the unknown voltage. Although this method is potentially faster than time encoding, the voltage must still be clamped during reading time, the circuitry is more complex than with many diode matrices, and the accuracy depends upon the trial voltage and resistor accuracy and stability.

In spatial encoding, a mask is placed on the face of the cathode-ray tube, and the scan line is positioned on the Y-axis by the unknown voltage. As the scanning beam sweeps the face of the tube, the mask allows pulses of light, binary coded to represent the unknown value, to pass through. The light is focused upon a photoelectric cell which introduces the pulse train into the circuit. The use of a redundant mask avoids ambiguity at the cost of only a half-bit error. Because of the cathode-ray tube response, sampling can be done at a rate sufficiently high to make clamping during reading unnecessary. Such a system has a conversion rate of $10^7$ conversions per second with a .1% accuracy.

In logic encoding, the analog signal is converted into three-bit binary or three-state form at a rate of $10^7$ conversions per second. Such a system is still in the experimental stage.

A method employing delta modulation transmits only changes in shade. The first sample of the analog signal is clamped, compared with the next sample, and the difference therebetween is encoded. Among the disadvantages is that the accuracy of determining the difference decreases as the slope of the analog curve increases. This increases the difficulty of accurately encoding a rapidly changing variable. Since the succeeding values are each referenced to the preceding sample, errors are carried through and are cumulative. Even when the coding is carried out in two largely different size increments, mechanization of the system is highly complex.

From the above it will be seen that all of the known encoding systems convert the analog data serially into a binary code. Although there are certain advantages in a conversion to binary (such as fully developed and widespread usage of processing techniques and circuitry) there is also a basic disadvantage. In transmitting a television signal, for example, in order to code eight shades of gray, then three bits per word (or shade) are required. Consequently, the information rate and time interval per picture element are tripled. In many situations this increase in bandwidth (information rate) cannot be tolerated.

In accordance with a feature of the present invention, there is provided a system for free path transmission of video data which is relatively immune to Doppler effects as well as static and multipath interference, while at the same time requiring lower power for high quality transmission, utilizing relatively simple apparatus for coding to separate competing transmissions, and, in addition, remaining relatively secure from interception and analysis in cases where security of the information being transmitted is essential. Furthermore, these objectives are accomplished by inexpensive and relatively simple apparatus which can be fabricated and assembled at low cost.

In its most fundamental form, the present concept employs a detector to divide an analog video signal from the camera or pickup tube into discrete levels, and an FM transmitter to transmit these levels as pulse code modulation with a separate frequency being employed for each level. At the receiver, a plurality of filters separate out each level of the signal as originally coded, with these derived signals being employed to gate a corresponding potential to the control grid of the image-reproducing tube. The original shades of gray in the analog signal are thus reconstituted with a fidelity dependent upon the sampling frequency. In such a system the receiver needs only to determine the presence or absence of a pulse in order to read the shade of gray transmitted.

One object of the present invention, therefore, is to provide an improved system for data transmission and reception utilizing an analog-to-digital conversion process.

Another object of the invention is to provide a video data transmission system in which a developed analog signal is quantized into individual pulses each pulse representative of an instantaneous amplitude level of the original wave.

A still further object of the invention is to provide a method and apparatus for dividing an analog video signal into discrete voltage levels, and for modulating a FM transmitter so as to transmit these levels as pulse code modulation with a separate frequency being employed for each level.

A still further object of the invention is to provide a video data transmission system which is essentially immune to Doppler effects as well as static and multipath interference.

Other objects, advantages, and novel features of the invention will become apparent from the following detailed description of the invention when considered in conjunction with the accompanying drawings wherein:

FIG. 1 is a schematic diagram, largely in block form, of a preferred embodiment of video data transmission apparatus designed in accordance with the present invention;

FIG. 2*a* is a graph indicating the manner in which a video signal of analog form is quantized into a number of discrete amplitude levels;

FIG. 2*b* is a graph indicating the manner in which pulses representing the quantized analog signal may be deployed for transmission on separate frequencies corresponding in number to the voltage levels of FIG. 2*a*;

Figure 1:
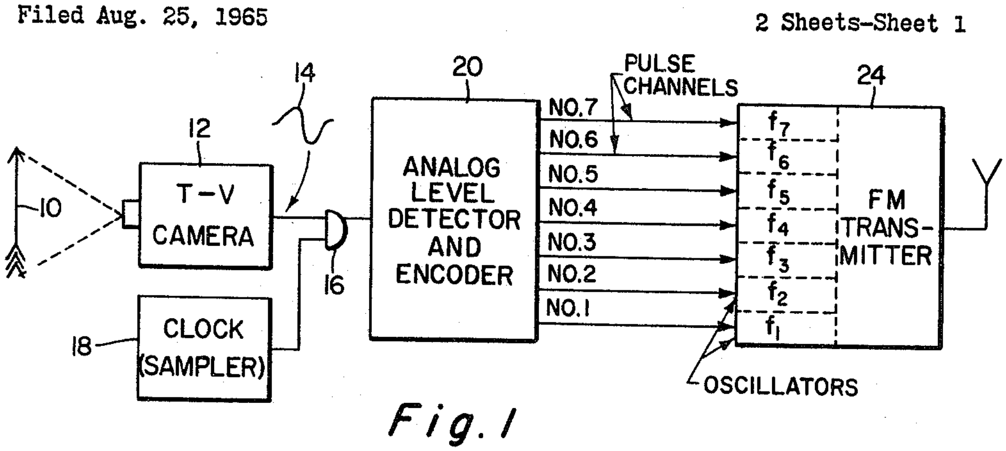

Referring now to FIG. 1 of the drawings, there is shown a video data transmission system designed in accordance with a preferred embodiment of the present invention. This system, intended to convey to a remote point data respecting the characteristics of an object identified by the reference numeral 10, includes a standard television camera 12 which develops an output signal 14 of analog form. In accordance with a feature of the invention, this analog signal 14 is sampled at regular intervals by passing such signal through a gate 16 which also receives the output of a clock 18 which, in conventional fashion, may comprise a pulse generator cyclically developing pulses at some video frequency such, for example, as 2.18 megacycles per second. Consequently, the intervals at which the analog signal 14 is sampled may be designated in both FIGS. 2*a* and 2*b* of the drawings by $t_1$, $t_2$, $t_3$ . . . . The cyclically-recurring pulses which pass through the gate 16 are applied to an analog level detector and encoder 20 the details of which will be set forth in connection with a description of FIG. 3 of the It has been brought out above that a feature of the persent invention resides in a production of a continuous output of signals quantizing the video voltage as rapidly as the latter changes. To illustrate this characteristic of the present concept, reference may be made to FIG. 2*a* of the drawings, in which the analog wave 14 representing the output of the television camera 12 of FIG. 1 is illustrated. It is desired to sample this wave 14 at the intervals $t_1$, $t_2$, $t_3$ . . . and it will be recognized that at each of these sampling intervals the wave 14 is at a certain voltage level which can be represented by the incremental designations 1 through 7. It is desired to develop a series of output pulses from the analog level detector and encoder 20 of FIG. 1 such that, at any given instant of time, the pulse being produced by the unit 20 will represent a particular voltage level of the analog wave 14, and to gate these sequentially-developed pulses into a plurality of channels so that each channel contains only pulses representative of a selected voltage level of the analog signal. To accomplish this objective, the particular analog level detector and encoder of FIG. 3 was developed.

Figure 2A:
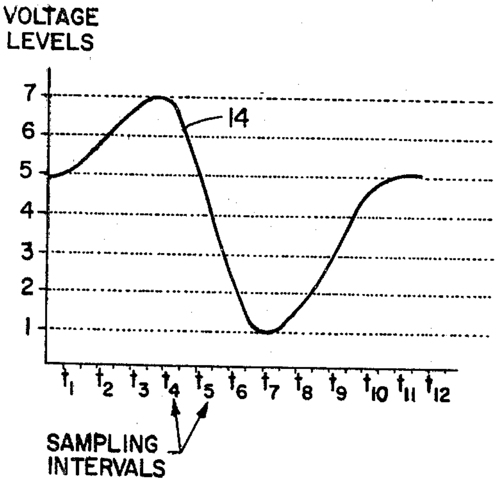

As shown in the drawing, the gated video signal (which has been sampled at the time intervals shown in FIG. 2*a*) is applied to a logic matrix the purpose of which is to quantize such viedo signal into individual pulses for each of the seven voltage levels of FIG. 2*a*. These levels in turn represent seven shades of gray in the image developed from the object 10 of FIG. 1. This matrix, which may if desired by of modular form, includes a plurality of detectors 22 which are designed to pass input signals in incremental levels, such for example as 100 millivolts. In other words, detecteor #1 will pass all input signals having an amplitude in excess of 100 millivolts, while detector #2 will pass all input signals having an amplitude greated than 200 millvolts, detector #3 all input signals having an amplitude greater than 300 millivolts, etc. The output of each of the detectors 22 is applied over a separate conductor to an FM transmitter 24 (FIG. 1), and also to one of a corresponding number of signal inverters 26 respectively connected to a plurality of gates 28. When a particular signal inverter 26 is activated by a pulse from its associated detector 22, it acts to inhibit or close its associated gate 28 in a manner now to be described.

Figure 3:
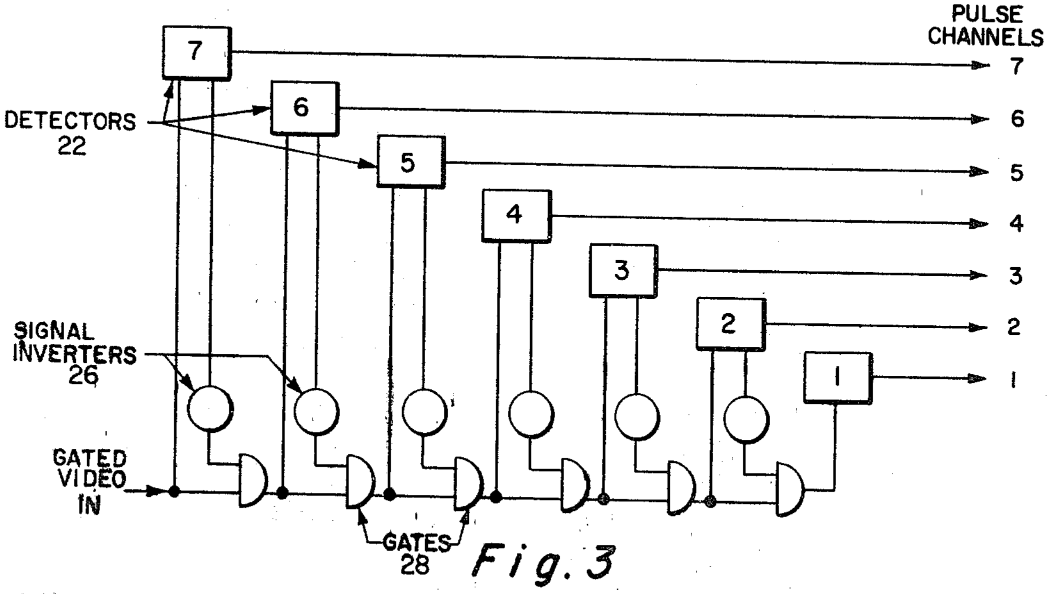
FIG. 3 is a detailed showing of the analog level detector and encoder of FIG. 1.

Let it be assumed that the gated video signal 14 enters the matrix of FIG. 3 after passing through the gate 16 of FIG. 1. If it be further assumed that any particular time instant the voltage of this signal 14 is 630 millivolts (for example) then detector #7 will pass no signal inasmuch as the latter has not reached the 700 millivolt level. However, detector #6 will pass this input signal to its output channel #6 and also to its associated one of the inverters 26. This impulse will inhibit the associated gate 28 so that none of the detectors 1 through 5 will receive the signal. Only a single pulse, therefore, is developed by the matrix, and this is present in output channel #6. In corresponding fashion, an input pulse of any other voltage (such, for example, 240 millivolts) will not activate any of the detectors 3 through 7, but will be passed by detector #2 to its output channel while at the same time closing its associated gate so that detector #1 will not receive such pulse. Only a single pulse therefore appears in the output of the matrix. The input signal 14 is thus quantized into discrete steps each of which is representative of the voltage level of the analog signal at a given instant of time.

Figure 2B:
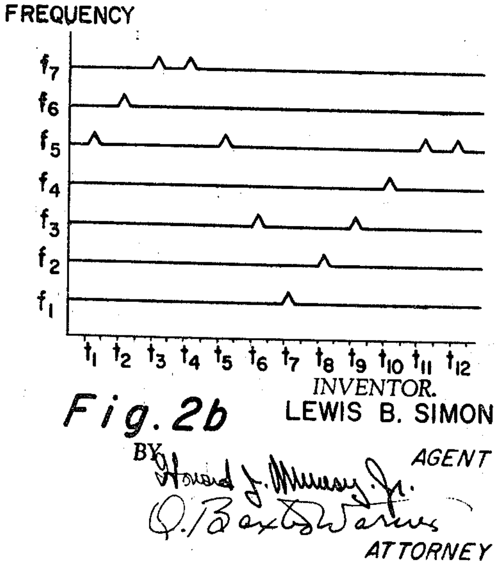

The output pulses from the matrix of FIG. 3 are, as above mentioned, applied to the transmitter 24 of FIG. 1. This transmitter 24 includes a plurality of oscillators equal in number to that of the pulse channels, with each oscillator being arranged to operate at a frequency different from that of the others. As brought out by FIG. 1, the pulses produced in channel #1, for example, are employed to gate the oscillator associated with channel #1, so that the pulses therein are transmitted at frequency $f_1$. A pulse in any other channel, such, for example, as one appearing in channel #4, will activate its associated oscillator and be transmitted at a frequency $f_4$. In other words, the pulses of any one channel are transmitted at a carrier frequency different from that at which pulses in any other channel are trasmitted. This is best brought out by the graph of FIG. 2*b*, in which each of the oscillator frequencies is represented as corresponding to one of the voltage levels 1 through 7 of FIG. 2*a*. Summarizing, therefore, all pulses developed at a particular voltage level in FIG. 2*a* are transmitted at a certain frequency corresponding thereto as shown by FIG. 2*b*.

Figure 4:
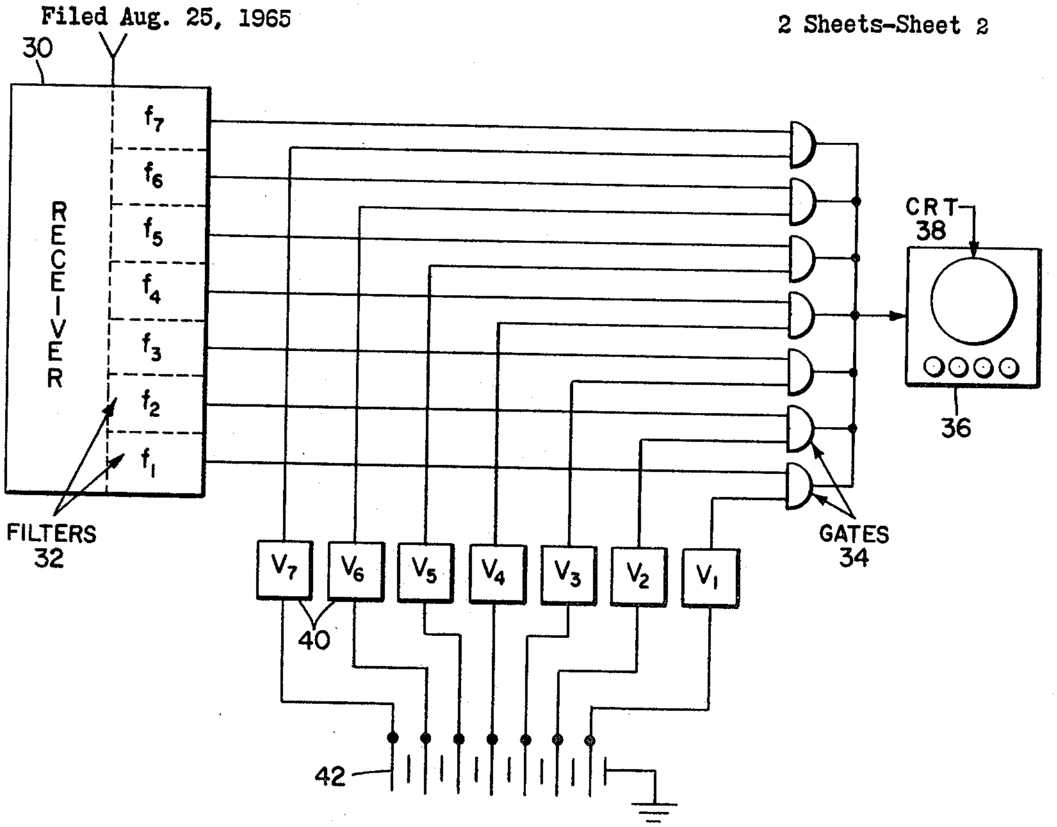
FIG. 4 is a largely schematic diagram of a receiving system designed in accordance with a preferred embodiment of the present invention, and arranged to receive the signal transmitted by the apparatus of FIG. 1.

A circuit for receiving the data transmitted by the apparatus of FIG. 1 is illustrated in FIG. 4 of the drawings. This circuit includes a receiving unit 30 which incorporates therein a plurality of filters 32. The latter are equal in number to the oscillators included in the FM transmitter 24 of FIG. 1, and are intended to separate from the received signal the various pulse channels into which the respective outputs of the analog detector and encoder 20 of FIG. 1 are applied. In other words, there is derived from the receiver 30 of FIG. 4 the original pulses which represent the various voltage levels of FIG. 2*a* and which appear in timed sequence as brought out by FIG. 2*b*. Each of the filters 32 is connected to one of a plurality of gates 34 which are of the "and" type, the outputs of all of the gates 34 being connected together and applied as over an input conductor to a monitor 36 which includes as a component thereof a cathode-ray tube 38.

Figure 5:
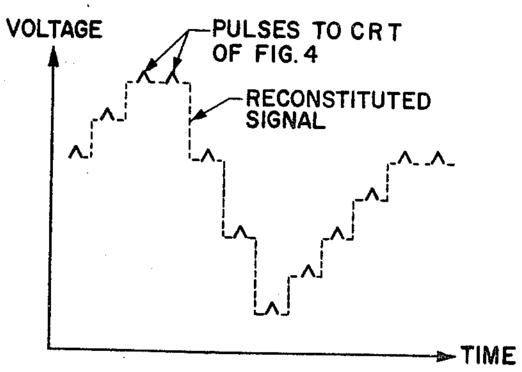
FIG. 5 is a graph indicating the manner in which the analog signal of FIG. 2*a* is reconstituted by the receiving apparatus of FIG. 4.

In order to reconstitute the original analog signal 14, each of the gates 34 is provided with a different potential through a plurality of level-setting circuits 40 each of which derives its energy in successively-increasing increments from a battery or other source of potential 42. The potential levels set by the units 40 are equivalent to the voltage levels designated by number in FIG. 2*a*. As a result, the appearance of an output pulse from filter $f_5$ (for example) in FIG. 4 will open its associated gate 34 and pass therethrough a DC potential from the level-setting unit $V_5$ so that during the particular time period of the pulse, a voltage $V_5$ is applied to the control electrode of the cathode-ray tube 38. The screen of the latter is therefore illuminated at a particular shade of gray corresponding to that established by the voltage level $V_5$. Succeeding pulses establish other voltage levels according to the particular channels in which they appear. FIG. 5 illustrates the pulses applied to the cathode ray tube 38 of FIG. 4, these pulses being substantially identical both time-wise and voltage-level-wise to the pulses illustrated in FIG. 2*b*. It is assumed that the monitor 36 of FIG. 4 incorporates therewithin some form of integrating network for smoothing out the sharp edges of the reconstituted signal of FIG. 5 so that it will be nearly identical to the analog wave 14 of FIG. 2*a*.

It should be emphasized that an important characteristic of the present concept resides in the simplification of existing equipment. It is only necessary that the recevier of FIG. 4 be so arranged as to determine the *presence* or *absence* of a pulse in order to read the particular shade of gray being instantaneously transmitted. This is of course more readily accomplished than the determination of some particular characteristics of a pulse, which frequently is of such a nature as to be critical either time-wise, amplitude-wise or in some other respect.

It will be appreciated that the maximum element information transmission rate of the method described is limited only by the rise and decay times of the various components incorporated therein, whereas binary three-bit words, for example, would have a maximum transmission rate of only one-third the above element information rate. Presently-known integrated circuitry and computer elements such as diodes, transistors, flip-flop networks, and logic gates can operate within the time interval of approximately 10 nanoseconds. If allowance be made of 10 nanoseconds each of rise and decay, and 25 nanoseconds for spacing and reading level duration, there is a total of only 70 nanoseconds per word or image element. Consequently, the apparatus described can quantize at a rate in excess of 14 megacycles. This exceeds by a considerable amount the maximum rate obtainable from other types of coded transmission equipment.

Although the invention has been described in connection with a television system, it will be recognized that it is particularly adaptable as well to the guidance of a missile or other projectile for remote weapon delivery, and the guidance of a drone for remote surveillance. For example, a carrier-based aircraft, by utilizing the present invention, will be capable of performing a surveillance mission and simultaneously transmitting the information to the carrier in real time for immediate command evaluation and appropriate action. With respect to warhead effectiveness, an operator can remotely guide a video-camera-equipped missile to impact on a target. As to surveillance, the present time lag caused by the necessity of processing photographic negatives can be eliminated completely, improving attack force response capability.

Obviously many modifications and variation of the present invention are possible in the light of the above teachings. It is therefore to be understood that within the scope of the appended claims the invention may be practiced otherwise than as specifically described.

I claim:

1. In a system for the transmission of an analog signal which is subject to variations at video frequency, the combination of:

means for cyclically sampling the analog signal to develop a series of regularly-recurring equally-spaced pulses;

a logic matrix including a plurality of detectors each controllably receiving the pulses developed by said cyclic sampling means, each detector of said plurality being designed to pass an input pulse having an amplitude level different from that of the pulses passed by all the remaining detectors of said plurality;

a plurality of transmitters respectively receiving the output of said plurality of detectors, each of said transmitters operating on a different pre-assigned frequency; and a plurality of signal inverters also respectively receiving the output of said plurality of detectors, the reception of a particular pulse by any one of said plurality of inverters from its associated detector acting to preclude the application of such pulse to those other detectors of said plurality which are designed to pass pulses having an amplitude level below that of such particular pulse.

References Cited

UNITED STATES PATENTS 2,270,070 2/1942 Reeves -------------- 325—59

ROBERT L. GRIFFIN, Primary Examiner

J. A. ORSINO, Assistant Examiner

U.S. Cl. X.R.

178—6.8, 7.2; 325—30, 59, 163; 332—11; 328—150